Nov. 17, 1970 — A. MAROSY — 3,540,087
COUPLING
Filed Jan. 31, 1969 — 2 Sheets-Sheet 1

INVENTOR.
ANDRE MAROSY
BY Littemore, Zulber & Belknap
ATTORNEYS

Nov. 17, 1970  A. MAROSY  3,540,087

COUPLING

Filed Jan. 31, 1969  2 Sheets-Sheet 2

INVENTOR.
ANDRE MAROSY
BY Whittemore, Hulbert
& Belknap

ATTORNEYS

United States Patent Office 3,540,087
Patented Nov. 17, 1970

3,540,087
COUPLING
Andre Marosy, 24731 Kipling Ave.,
Oak Park, Mich. 48237
Filed Jan. 31, 1969, Ser. No. 795,501
Int. Cl. A44b 17/00
U.S. Cl. 24—211                                    8 Claims

ABSTRACT OF THE DISCLOSURE

A quick-connect, positive locking coupling member is provided. The coupling includes a male member and a female member. The male member has a rod with at least one lateral extension on one end thereof. The female member includes a tubular housing with an end closure which has an opening to receive the rod and a notch operative to receive the lateral extension of the rod. A locking element is slidably mounted within the tubular housing. Spring means bias the locking element towards the end closure. The locking element is a cylindrical member with at least one marginal edge spiraled outwardly around the periphery towards the end closure. The guide means position the locking element with a portion of the marginal edge portion in alignment with the notch in the end closure. The extension is cammed along this edge portion upon insertion of the male member and is received in a notch provided in the locking element after it has passed over the marginal edge portion to be locked in place. Means are associated with the guide means to permit holding of the locking element in a position away from the end closure to permit removal of the lateral extension from the notch and relative rotation of the male member for disengagement of the two members.

BACKGROUND OF THE INVENTION

There are many instances where it is desired to have a coupling which will automatically and positively lock when the coupling members are joined together. For example, the connection made in a fluid hose, such as a pneumatic or hydraulic hose, wherein it is desired that the hose not become disconnected except upon a positive manual action. Electrical wiring wherein two wire parts may be live should not be disconnected inadvertently.

In my patent application, Ser. No. 704,813, filed Feb. 12, 1968, and in my Pat. No. 3,286,316, issued Nov. 22, 1966, I have disclosed coupling mechanisms which automatically lock and which require manual action in order to be unlocked. The present invention comprises an improvement over my previous developments. The improvement resides in the means for unlocking the coupling. In accordance with my present invention, the coupling may not be disengaged unless a sequence of steps is followed which could not be accomplished inadvertently, as by jostling or vibrating the coupling or by handling of the coupling during use. A four step technique is provided which requires pushing the coupling in one direction, pulling the coupling in another direction, turning the coupling in one direction and turning the coupling in the other direction before the coupling may be disengaged. Random forces applied to the coupling would not result in the desired steps. However, the coupling is relatively easy to disengage when desired. Further, the basic structure of the coupling is relatively inexpensive and is capable of rough usage in the field and relatively wide dimensional tolerances in manufacture.

SUMMARY OF THE INVENTION

The coupling comprises a male member and a female member. The male member comprises a rod having at least one lateral extension adjacent one end thereof. The female member comprises a tubular housing. An end closure is provided on one end of the housing. The end closure has an opening including a notch operative to receive the end of the rod with the lateral extension received in the notch. A locking element is slidably mounted within the tubular housing. Spring means are provided for biasing the locking element towards the end closure. The locking element comprises a body having at least one marginal edge portion spiraled outwardly therefrom around the periphery thereof towards said end closure. Guide means are provided to position the locking element with a portion of said marginal edge portion in alignment with said notch in the end closure of the tubular housing whereby insertion of the rod of the male member through the end closure results in contact of the lateral extension with the marginal edge portion and forces the locking element away from the end closure with said marginal edge portion camming the lateral extension to rotate the male member about its axis after insertion of the lateral extension through the end closure. The body has a notch adjacent to the marginal edge portion to receive the lateral extension and lock the male member against rotation relative to the body. Means are associated with the guide means to lock said body in a position away from the end closure to permit removal of the lateral extension from the notch and relative rotation of the male member and body for disengagement of the coupling members.

Figure 8:
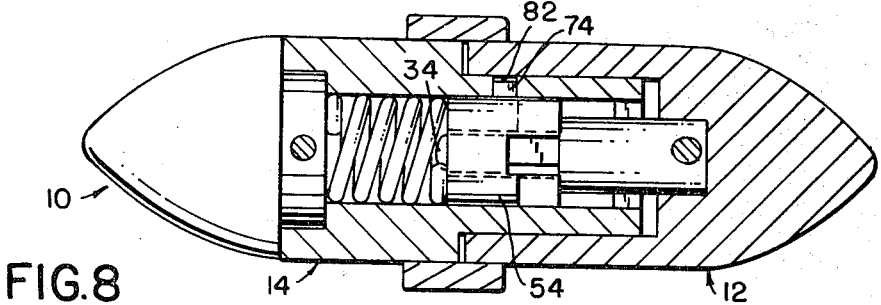
FIG. 8 illustrates the second step for uncoupling which involves twisting the coupling elements in one direction relative to each other.
Figure 9:
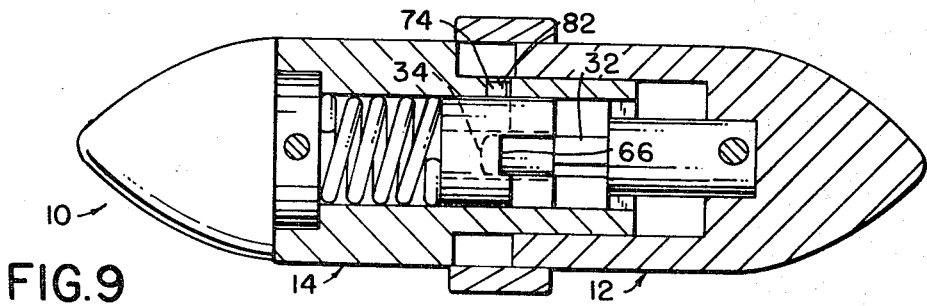
Figure 10:
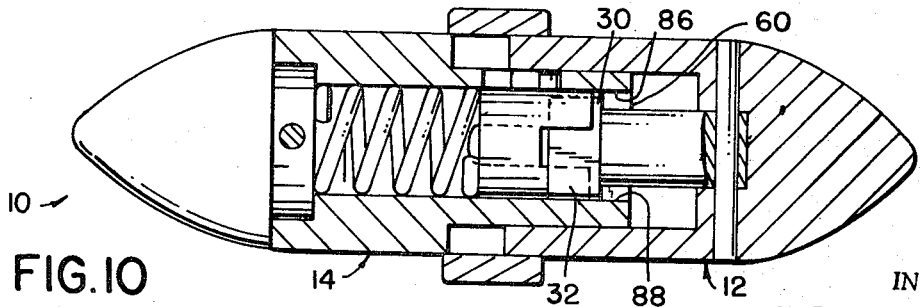

FIG. 9 illustrates the third step for uncoupling which involves pulling the elements apart while remaining in the relative twisted position of FIG. 8; and FIG. 10 illustrates the final step for uncoupling the elements which involves turning the male element 90 degrees in the other direction with respect to the female element for removal through slots provided in the end plate of the female element.

Figure 1:
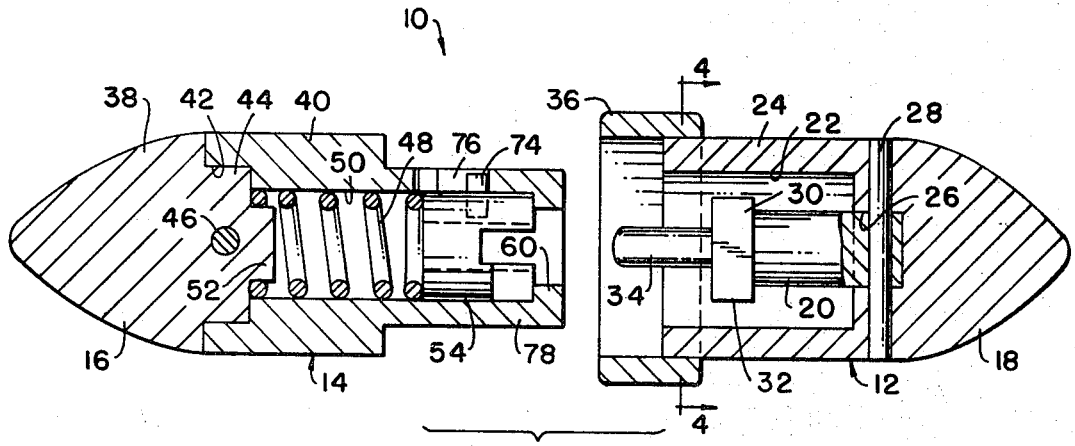
FIG. 1 is a sectional view of the coupling forming one embodiment of the present invention with the parts separated from each other in open position.
Figure 2:
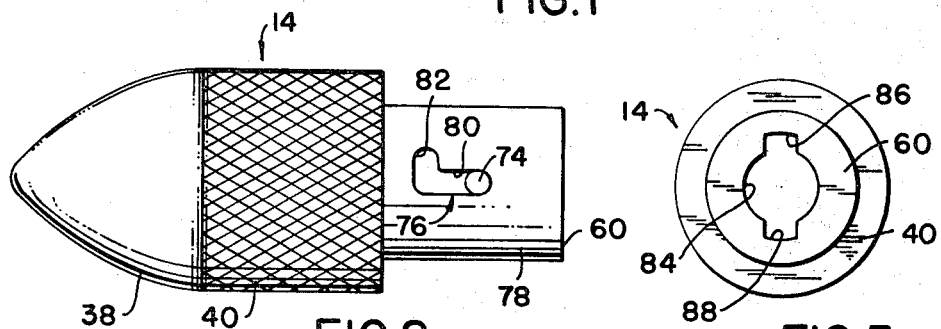
FIG. 2 is a side elevational view of the female coupling element of FIG. 1.
Figure 6:
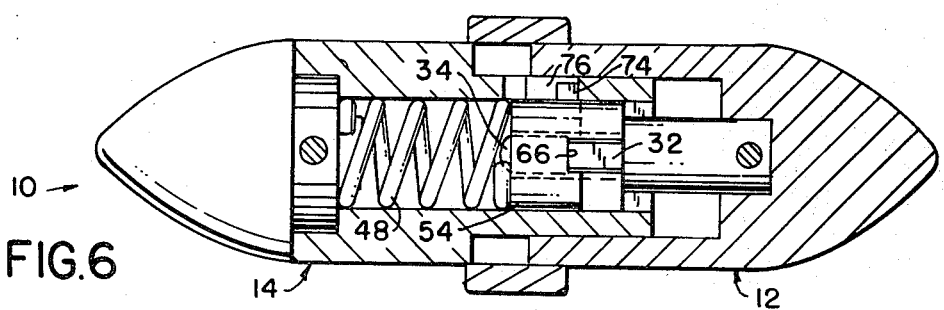
FIG. 6 is a sectional view of the coupling illustrated in the normally closed and locked position.

Referring to FIG. 1, the coupling generally indicated at 10 comprises a male element 12 and a female element 14. These members have an uncoupled position as illustrated in FIG. 1 wherein they are separated and a coupled position as illustrated in FIG. 6 wherein they are locked together. The ends 16, 18 of the coupling elements are illustratively shown as a torpedo-like shape. It will be appreciated that structure may be secured to the ends 16, 18 for connection to parts to be secured together, for example, jewelry necklaces, the hood of an automobile to the body of the automobile, pneumatic and hydraulic tubes, electrical wiring and the like.

The male element 12 comprises an elongated rod 20 which is received centrally and longitudinally within a recess 22 provided in body member 24. A small diameter recess 26 is provided at the bottom of recess 22 to receive the inner end of the rod 20. A pin 28 extends through openings provided in the body and in the rod 20 to secure the rod inplace. The rod 20 has a pair of lateral extensions 30, 32 intermediate the ends thereof. The extensions 30, 32 are generally rectangular in form and are displaced at 180 degrees with respect to each other to thereby extend in diametrically opposite directions. A rod portion 34 of reduced diameter extends from the extensions 30, 32 outwardly of the recess 22. A ring-like element 36 is received over the end of the body 24 and is secured thereto as by a press fit. The interior of the ring 36 forms an extension of the recess 22 of larger diameter than the recess 22.

The female element 14 comprises segmented body portions including an end member 38 and a tubular member 30. A recess 42 is provided in one end of the tubular member 40 to receive a cylindrical projecting portion 44 provided on the end member 38. A pin 46 holds these members together in assembled relationship. A coil spring 48 is received within the central bore 50 of the tubular member 40. A cylindrical projection 52 of smaller diameter extends from the cylindrical projection 44 into the center of the spring 48 to position the spring.

The spring 48 abuts against a locking element 54 and normally biases the locking element to a forward position as illustrated in FIG. 1. The locking element 54 is a cylindrical tubular member, the central opening of which receives the rod portion 34 of the male member when the coupling is engaged. The forward end of the locking member 54 has two diametrically opposed flat surfaces 56, 58. These surfaces abut against a flange or end closure 60 provided on the forward end of the tubular member 40 when the locking member 54 is biased to its forwardmost position. A downwardly or rearwardly inclined surface 62, 64 extends from one side of each of the surfaces 56, 58. The surfaces 62, 64 act as camming surfaces for the extensions 30, 32 of the male member to cause the male element to turn when the two elements are forced together. A rearwardly extending notch 66, 68 is provided at the end of each of the surfaces 62, 64. The notches 66, 68 serve to receive the extensions 30, 32 at the end of their turning movement. An abutment surface 70, 72, forming one side of the notches, extends back to the flat surfaces 56, 58. The surfaces 70, 72 serve as stops for the extensions 30, 32 preventing further turning movement thereof after the coupling is engaged.

A pin 74 extends from the exterior surface of the locking member 54 intermediate the ends thereof at an angle of substantially 90 degrees to the longitudinal axis of the locking member. The pin 74 engages an L-shaped slot 76 provided in the side wall of the portion 78 of the tubular member 40. It will be noted that the portion 78 is of reduced diameter with respect to the remaining portion of the tubular member. The first segment 80 of the slot 76 extends longitudinally of the portion 78. The second portion 82, which is spaced inwardly or rearwardly of the forward end closure 60, is at right angles to the first portion and is of smaller length. The first portion 80 acts as a guide during forward and rearward movement of the locking member 54. The second portion 82 serves as a means to lock the pin and consequently the locking member 54 in place during disengagement of the coupling.

Figure 3:
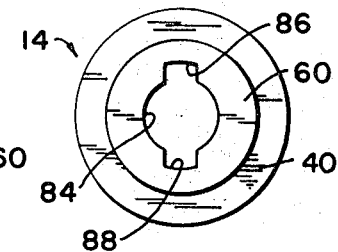
FIG. 3 is an end view of the FIG. 2 element.
Figure 4:
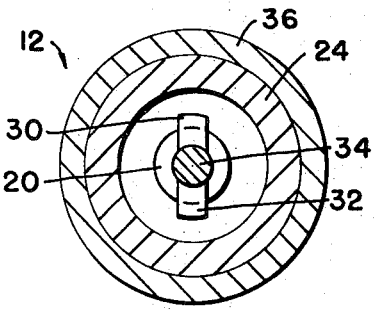
FIG. 4 is a sectional view of the male element taken substantially along the line 4—4 of FIG. 1 looking in the direction of the arrows.
Figure 5:
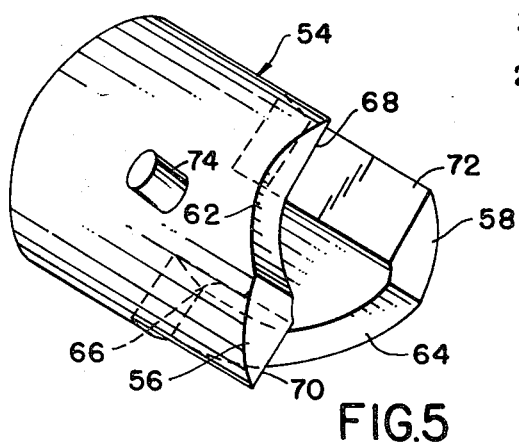
FIG. 5 is a perspective view of the camming and locking device utilized in the female element.

The end closure 60 provided on the forward end of the portion 78 defines a central opening 84 for the reception of the rod portion 34. It will be noted by comparison of FIGS. 3 and 4 that the diameter of the opening 84 is larger than the diameter of the rod portion 34 for easy insertion of the rod portion. As shown in FIG. 3, diametrically opposed slots 86, 88 are provided in the end closure 60 extending from the opening 84 to receive the extensions 30, 32 of the male element.

Operation of the coupling may now be understood. The coupling elements 12, 14 are initially placed in the position illustrated in FIG. 1. The rod portion 34 of the male element is inserted through the opening 84 of the end closure 60. The element 12 is turned until extensions 30, 32 are in alignment with the slots 86, 88. The two elements are then forced together. The extensions 30, 32 make contact with the inclined surfaces 62, 64. This causes the locking element 54 to be forced rearwardly against the action of the spring 48. The locking element 54 is prevented from turning by engagement of the pin 74 in the slot portion 80. The male element will not initially turn because of the engagement of extensions 30, 32 with the edges of the slots 86, 88 in the end closure 60. However, there is enough built-in tolerance in the coupling elements to permit insertion of the male element without turning at the initial stages. After the extensions have passed beyond the end closure 60, the male element will begin to turn as it slides along the surfaces 62, 64. This moves the extensions out of alignment with the slots 86, 88. Continued insertion of the male element eventuually turns this element until the extensions 30, 32 align with the notches 66, 68. When this occurs, the spring 48 biases the locking element 54 forwardly to engage the extensions 30, 32 with the notches 66, 68.

Release of the elements 12, 14 results in the spring 48 driving the parts to the fully locked position as illustrated in FIG. 6. The coupling may not be disengaged by pulling or turning the parts because of the engagement of the extensions 30, 32 with the notches 66, 68.

Figure 7:
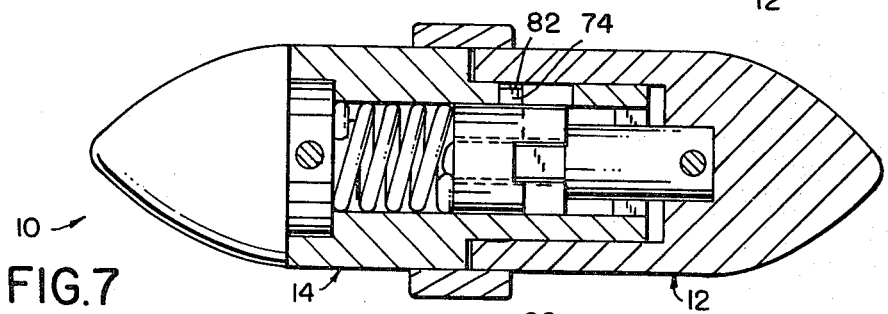
FIG. 7 is a view similar to FIG. 6 in which the coupling elements have been moved together in the first step preparatory to disengagement of the elements.

FIGS. 7-10 illustrate the technique for disengaging the elements 12, 14. The first step is illustrated in FIG. 7. The two elements are pressed together so that the pin 74 is in alignment with the slot segment 82.

Then, as illustrated in FIG. 8, the elements 12, 14 are turned clockwise (as viewed from the respective ends thereof) whereupon the locking member 54 is caused to turn and carry the pin 74 into the slot portion 82.

Then, as shown in FIG. 9, the elements 12, 14 are pulled apart without turning. The locking element 54 will remain in place because of the engagement of the pin 74. The dimensions of the parts are so arranged that there is sufficient space between the inner surface of the end closure 60 and the extensions 30, 32 to permit complete withdrawal of the extension from the notchese 66, 68.

Finally, as viewed in FIG. 10, the two elements 12, 14 are turned in the counter-clockwise direction (as viewed from the respective ends thereof in FIG. 10) to realign the extensions 30, 32 with the slots 86, 88 in the end closure 60. The locking element 54 is released during this movement because of the engagement of the extensions 30, 32 with the inclined surfaces 62, 64. However, unless the elements 12, 14 are turned in the reverse direction, that is the clockwise direction, the extensions will not re-engage with the notches 66, 68. After the extensions 30, 32 have again been aligned with the slots 86, 88, as shown in FIG. 10, the elements 12, 14 may be pulled apart to disengage the coupling.

As will be appreciated from the structure thus described, the coupling 10 is automatically engaged upon joining of the two elements 12, 14. Engagement is such that the elements 12, 14 cannot be separated unless the specific sequence of steps for disengagement is followed. As a consequence, the coupling will not be disengaged inadvertently as the result of handling or as the result of vibrations or forces experienced during use.

What I claim as my invention is:

1. In a coupling comprising a male member and a female member, the male member comprising a rod having at least one lateral extension adjacent one end thereof, the female member comprising a tubular housing, an end closure on one end of the housing having an opening including a notch operative to receive the end of said rod with the lateral extension received in the notch, a locking element slidably mounted within the tubular housing, means for biasing the locking element toward said end closure, the improvement consisting of said locking element comprising a body having at least one marginal edge portion spiraled outwardly therefrom around the periphery thereof towards said end closure, guide means positioning the locking element with a portion of said marginal edge portion in alignment with said notch in the end closure of the tubular housing whereby insertion of the rod of the male member through the end closure results in contact of the lateral extension with said marginal edge portion and forces the locking element away from the end closure with said marginal edge portion camming the lateral extension to rotate the male member about its axis after insertion of the lateral extension through said end closure, said body having a notch adjacent to the marginal edge portion to receive the lateral extension and lock the male member against rotation relative to the body, and means associated with said guide means to lock said body in a position away from the end closure to permit removal of the lateral extension from said notch and relative rotation of the male member and body for disengagement of the coupling members.

2. A coupling as defined in claim 1, and further characterized in that said guide means includes an L-shaped slot in the wall of said tubular housing, a first portion of said slot being substantially longitudinal with respect to the housing to accommodate longitudinal movement of the locking element, a second portion of said slot being at substantially right angles to said first portion, a pin extending from said locking element and received in said slot, said pin and first portion of the slot functioning to guide the locking element in its longitudinal movement within the tubular housing, the second portion of the slot functioning to restrain longitudinal movement of the locking element upon turning of the locking element to cause egagement of the pin in the second portion of the slot to thereby permit said removal of the lateral extension from said notch.

3. The coupling as defined in claim 1, and further characterized in that said body comprises a cylindrical element, said cylindrical element having a central bore to receive the end of said rod upon insertion of the rod into the female member.

4. The coupling as defined in claim 1, and further characterized in that said rod has two lateral extensions adjacent one end thereof, said lateral extensions being diametrically opposed, the opening in the end closure of the housing having a pair of notches to receive said lateral extensions, said body having two marginal edge portions which are spiraled outwardly in the same rotative direction around the periphery of the body towards the end closure whereby an even pressure is applied to the locking element upon insertion of the male member.

5. A coupling as defined in claim 4, and further characterized in the provision of a notch adjacent to each marginal edge portion to receive the lateral extension of the male member.

6. A coupling as defined in claim 1, and further characterized in the provision of a stop surface adjacent to said notch to prevent further rotation of the male member.

7. A coupling comprising a male member and a female member, the male member comprising a rod having at least one lateral extension adjacent one end thereof, the female member comprising a tubular housing, an end closure on one end of the housing having an opening including a notch operative to receive the end of said rod with the lateral extension received in the notch, a locking element slidably mounted within the tubular housing, guide means in the tubular housing in engagement with the locking element, means for biasing the locking element towards said end closure, the face of said locking element adjacent to said end closure having a surface formed laterally therein with its greatest depth in the center and with at least a portion sloping from said center to the edges of the locking element, said guide means positioning the locking element with a portion of said surface in alignment with said notch in the end closure of the tubular housing whereby insertion of the rod of the male member through the end closure results in contact of the lateral extension with said surface portion and forces the locking element away from the end closure with said marginal edge portion camming the lateral extension to rotate the male member about its axis after insertion of the lateral extension through said end closure, said locking element having a notch adjacent to said surface at its point of greatest depth to receive the lateral extension and lock the male member against rotation relative to the locking element, and means associated with said guide means to lock said locking element in a position away from the end closure to permit removal of the lateral extension from said notch and relative rotation of the male member and locking member for disengagement of the coupling members.

8. In a coupling comprising a male member and a female member, the male member comprising a rod having at least one lateral extension adjacent one end thereof, the female member comprising a tubular housing, an end closure on one end of the housing having an opening including a notch operative to receive the end of said rod with the lateral extension received in the notch, a locking element slidably mounted within the tubular housing, means for biasing the locking element toward said end closure, the improvement consisting of said locking element comprising a body having at least one marginal edge portion spiraled outwardly therefrom around the periphery thereof towards said end closure, guide means positioning the locking element with a portion of said marginal edge portion in alignment with said notch in the end closure of the tubular housing whereby insertion of the rod of the male member through the end closure results in contact of the lateral extension with said marginal edge portion and forces the locking element away from the end closure with said marginal edge portion camming the lateral extension to rotate the male member about its axis after insertion of the lateral extension through said end closure, said body having a notch adjacent to the marginal edge portion to receive the lateral extension and lock the male member against rotation relative to the body, and means to hold said body in a position away from the end closure to permit removal of the lateral extension from said notch and relative rotation of the male member and body for disengagement of the coupling members.

References Cited

UNITED STATES PATENTS

| | | | |
|---|---|---|---|
| 3,184,816 | 5/1965 | McCarthy | 24—211 |
| 3,407,455 | 10/1968 | Metz | 24—221 |
| 3,413,692 | 12/1968 | Pressley | 24—211 XR |
| 3,426,399 | 2/1969 | Jones | 24—211 |
| 3,430,305 | 3/1969 | Geffner | 24—211 |

JOHN PETRAKES, Primary Examiner

U.S. Cl. X.R.

24—221